US005774730A

United States Patent [19]
Aizikowitz et al.

[11] Patent Number: 5,774,730
[45] Date of Patent: Jun. 30, 1998

[54] METHOD AND APPARATUS FOR IMPROVING COLORABILITY OF CONSTRAINED NODES IN AN INTERFERENCE GRAPH WITHIN A COMPUTER SYSTEM

[75] Inventors: Nava Arela Aizikowitz; Liviu Asnash, both of Haifa; Roy Bar-Haim, Neve Monosson; Orit Edelstein; Mircea Namolaru, both of Haifa, all of Israel; Edward Curtis Prosser, Rochester, Minn.; Robert Ralph Roediger, Rochester, Minn.; William Jon Schmidt, Rochester, Minn.

[73] Assignee: International Business Machines Corporation, Armonk, N.Y.

[21] Appl. No.: 509,637

[22] Filed: Jul. 31, 1995

[51] Int. Cl.⁶ ........................................ G06F 9/45
[52] U.S. Cl. .................... 395/709; 375/708; 375/705
[58] Field of Search ................................ 395/709, 708, 395/705

[56] References Cited

U.S. PATENT DOCUMENTS

| 4,571,678 | 2/1986 | Chaitin et al. | 364/300 |
| 5,249,295 | 9/1993 | Briggs et al. | 395/709 |

OTHER PUBLICATIONS

Peter E. Bergner, Peter J. Dahl, and Matthew T. O'Keefe, *Spill Code Minimization Via Arc Spilling*, Unversity of Minnesota Manuscript, Department of Electrical Engineering, 1993.

Preston Briggs, *Register Allocation via Graph Coloring*, PhD Thesis, Rice University, 1992.

Preston Briggs, Keith D. Cooper, and Linda Torczon, *Coloring Register Pairs*, ACM Letters on Programming Languages and Systems, ACM Press, vol. 1, No. 1, Mar. 1992, pp. 3–13.

David Callahan & Brian Koblenz, "*Register Allocation via Hierarchical Graph Coloring*", Proceedings of the ACM SIGPLAN '91 Conference on Programming Language Design and Implementation, SIGPLAN Notices, vol. 26, No. 6, pp. 192–203 (Jun. 1991).

Fred C. Chow & John L. Hennessy, "*The Priority–Based Coloring Approach to Register Allocation*", ACM Transaction on Programming Languages and Systems, vol. 12, No. 4, pp. 501–536 (Oct. 1990).

David Bernstein, Dina Goldin, Martin Golumbic, Hugo Krawczyk, Yishay Mansour, Itai Nahshon and Ron Pinter, *Spill Code Minimization Techinques for Optimizing Compilers*, ACM SIGPLAN Conference on Programming Languages Design and Implementation, 1989.

Preston Briggs, Keith D. Cooper, Ken Kennedy, and Linda Torczon, *Coloring Heuristics for Register Allocation*, ACM SIGPLAN Conference on Programming Languages Design and Implementation, 1989.

Fred C. Chow & John L. Hennessy, "*Register Allocation by Priority–Based Coloring*", Proceedings of the ACM Symposium on Compiler Construction, pp. 222–232 (Jun. 1984).

Auslander & Hopkins, *An Overview of the PL.8 Compiler*, ACM SIGPLAN Notices, vol. 17, No. 6, Jun. 1982.

Gregory J. Chaitin, "*Register Allocation & Spilling via Graph Coloring*", Proceedings of the ACM Symposium on Compiler Construction, pp. 98–105 (Jun. 1982).

Gregory J. Chaitin, Marc A. Auslander, Ashok E. Chandra, John Cocke, Martin E. Hopkins and Peter W. Markstein, *Register Allocation via Graph Coloring*, Computer Languages, 6:47–57, 1981.

Primary Examiner—Alvin E. Oberley
Assistant Examiner—R. S. Rosenholm
Attorney, Agent, or Firm—Derek P. Martin; Martin & Associates, L.L.C.

[57] ABSTRACT

A method and apparatus for coloring an interference graph yields a higher number of colored nodes by taking into consideration the colors of neighbors of a node's uncolored constrained neighbors. By assigning a color to a node that is also the color of a neighbor of an uncolored constrained neighbor, one color constraint is removed, increasing the probability of coloring the uncolored constrained neighbor. If more than one of the neighbors of the uncolored constrained neighbors are colored, one of the colors may be selected over the others using an appropriate heuristic.

16 Claims, 9 Drawing Sheets

METHOD AND APPARATUS FOR IMPROVING COLORABILITY OF CONSTRAINED NODES IN AN INTERFERENCE GRAPH WITHIN A COMPUTER SYSTEM

FIELD OF THE INVENTION

This invention generally relates to computer systems. More specifically, this invention relates to a method and apparatus for coloring an interference graph within a computer system.

BACKGROUND OF THE INVENTION

Graphs have been commonly used for centuries to model a variety of physical and mathematical relationships, and are often useful in solving problems that arise from these relationships. One problem that may be solved using a graph is determining how to allocate a large number of items to a smaller number of available resources (e.g., register allocation methods used in an optimizing compiler). One common method of graphically representing the relationship between the items and the resources uses an interference graph.

An interference graph is a tool which may be used to assign a limited number of resources to a large number of items that each need one of the resources. One example of an interference graph is shown in FIG. 2. Each item that requires a resource is represented by a "node", drawn on the interference graph of FIG. 2 as a circle, such as nodes A, B, C, D and E in FIG. 2. If two items require a resource at the same time, the items are said to "interfere" with each other. The interference between two items (i.e., nodes) is represented on the interference graph by connecting the two nodes that interfere with a line or "edge", such as the edge connecting nodes A and B in FIG. 2. Once the interference graph is complete, all the items that require a resource are nodes in the graph, and the edges of the graph show the interferences between these items. Now the task remains to assign the limited number of resources to the large number of nodes in the interference graph.

The nodes in an interference graph may be assigned to a smaller number of resources using a technique known as "graph coloring." Each resource is assigned a different color. A selected node on the interference graph may be colored with any color that is not used by one of its immediate neighbors (i.e., nodes connected to the selected node with an edge). This coloring scheme works because the edge represents an interference between nodes, which means that the nodes have a conflicting need for a resource. Since a resource (color) cannot service two items (nodes) that have conflicting needs, a color cannot be assigned to two nodes connected with an edge (i.e., neighbors). The large number of items may be successfully allocated to the smaller number of resources provided that each node in the interference graph may be colored with a color different from all its neighbors. If each node in the interference graph may be assigned a color subject to these constraints, the graph is "colorable."

Some interference graphs may not be colorable due to the number and/or arrangement of interferences between the nodes. If a node has a number of incident edges equal to or greater than the number of available colors, the node is "constrained", and may not be colored if all the available colors are used by its neighbors. If a node has fewer incident edges than available colors, the node is "unconstrained", since there is at least one color left which may be assigned to the node. An interference graph with all unconstrained nodes is inherently colorable. However, an interference graph that has one or more constrained nodes may or may not be colorable. If the graph is not colorable, the number of resources corresponding to colors cannot adequately service the number of items needing service, without modification of the system (e.g., reducing the need for resources). If the graph is colorable, the number of resources (colors) is adequate for the items (nodes). However, the fact that a graph is colorable only means that all the nodes in the interference graph may be colored if the colors are appropriately selected; whether or not a colorable graph with constrained nodes is successfully colored depends on the method for selecting a color for each node.

The coloring method determines the likelihood of coloring constrained nodes in an interference graph. For example, if ten colors (resources) are available, and a given node has three neighbors that have all been assigned unique colors, any of the remaining seven colors may be assigned to the node. However, a random or arbitrary selection of one of the seven available colors may result in constrained nodes that cannot be colored, while a more intelligent choice of color would increase the number of colored nodes, as discussed below in the Detailed Description section with respect to the preferred embodiments of the invention.

One known color selection scheme prioritizes the colors and assigns the highest priority color possible to each node. For example, if no neighbors have been colored, the highest priority color is assigned to the node. If the two highest priority colors are used by neighbors, the third color is assigned to the node, and so on. This color selection scheme succeeds in coloring more nodes than would result from using an arbitrary color selection scheme. However, even this prioritized coloring may result in constrained nodes being uncolored in a colorable interference graph.

The known methods of coloring an interference graph often do not succeed in coloring all the nodes, even though the graph is colorable. Thus, the benefit of using an interference graph is limited by the coloring scheme used. Without improved methods of coloring, the ability to allocate limited resources using an interference graph will be impaired.

SUMMARY OF THE INVENTION

According to the present invention, a method and apparatus for coloring an interference graph colors nodes by using information about the colors of the neighbors of uncolored constrained neighbors. A first embodiment in accordance with the present invention selects a color, when available, for a node that is the color of one of the neighbors of any of the node's uncolored constrained neighbors. If neighbors of uncolored constrained neighbors have more than one color, one of these colors is selected using an appropriate heuristic. The reason this method and apparatus improves colorability is clear: the uncolored constrained neighbor now has two neighbors with the same color, effectively removing a color constraint represented by one of the edges. Even if the uncolored constrained neighbor is still constrained after coloring two neighbors with the same color, subsequent color selection using this method and apparatus may free up a color for the node.

According to a second embodiment in accordance with the present invention, a method and apparatus for coloring an interference graph selects the color according to the number of the occurrences of the different colors in the colored neighbors of uncolored constrained neighbors. Rather than simply identifying the colors used and selecting one of these colors according to some heuristic (as in the first embodiment), the color selection method instead counts the number of occurrences of each color, and operates upon the counts with an appropriate heuristic to assign the current node a color based on the number of neighbors of uncolored constrained neighbors that have been assigned each color. In a variation of the second embodiment, the color selection method counts the number of uncolored constrained neighbors that have each color for a neighbor, effectively determining how many uncolored constrained neighbors would be "helped" by the selection of a given color.

A method and apparatus for coloring an interference graph in accordance with a third embodiment of the present invention uses a weighted count of the colors of the neighbors of uncolored constrained neighbors to select a color. Each occurrence of one of these colors is weighted according to some predetermined criteria, such as the importance or priority of the color at that particular node. Choosing the color with the most desirable weighted count results in a greater likelihood of coloring critical nodes.

The foregoing and other objects, features and advantages of the invention will be apparent from the following more particular description of preferred embodiments of the invention, as illustrated in the accompanying drawings.

BRIEF DESCRIPTION OF THE DRAWINGS

The preferred exemplary embodiments of the present invention will hereinafter be described in conjunction with the appended drawings, where like designations denote like elements, and.

DESCRIPTION OF THE PREFERRED EMBODIMENTS

Overview

Figure 1:
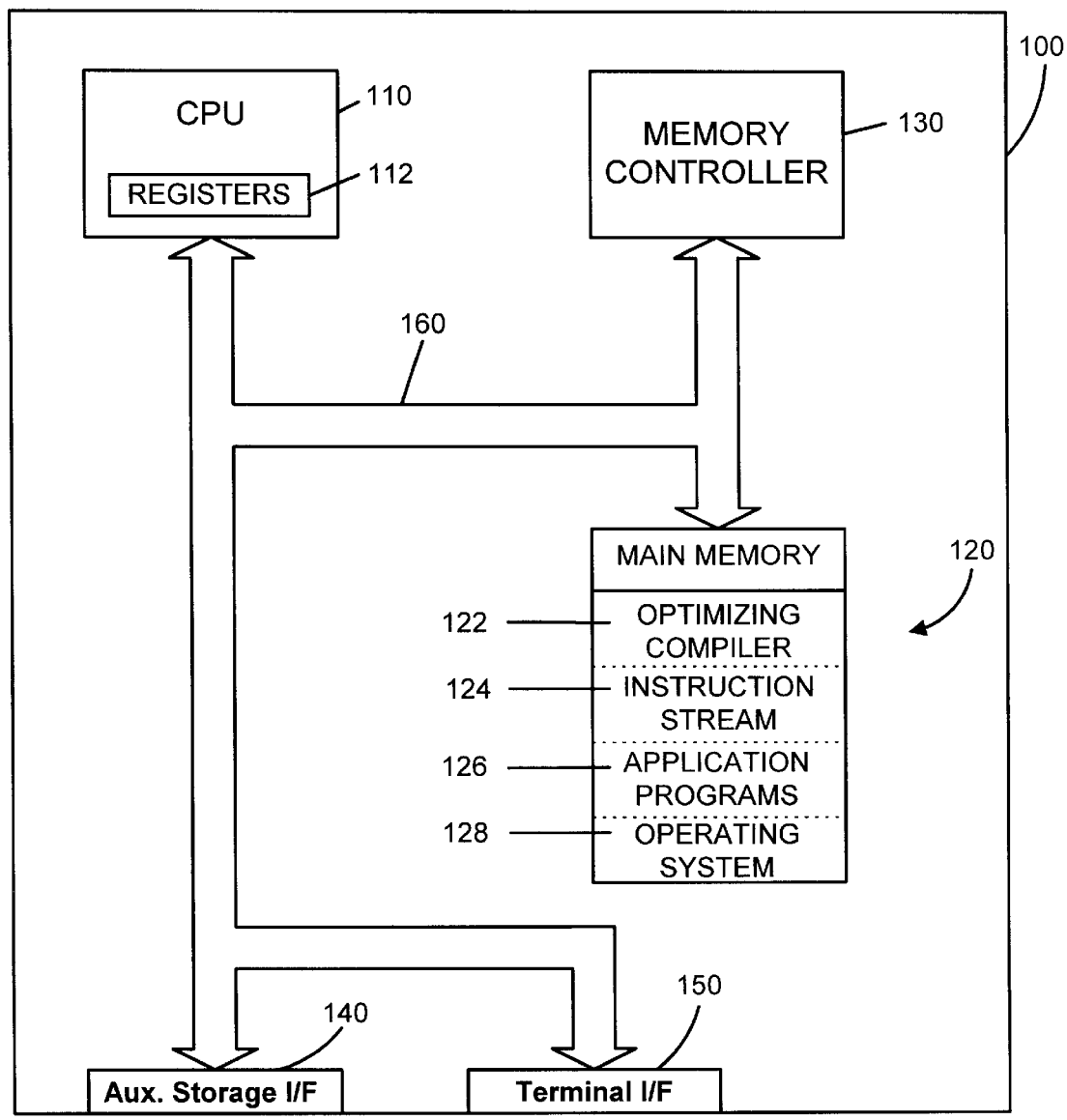
FIG. 1 a schematic block diagram of a computer system in accordance with the present inventions.

The method and apparatus of the present invention, while applicable to the coloring of any interference graph for any purpose, has particular applicability to the field of compilers, and specifically to the register allocation methods used in optimizing compilers. For those individuals who are not compiler experts, a brief overview of compilers and various register allocation mechanisms used in compilers is presented here.

Statements, Instructions, Compilers

Computer programs are constructed using one or more programing languages. Like words written in English, a programming language is used to write a series of statements that have particular meaning to the drafter (i.e., the programmer). The programmer first drafts a computer program in human readable form (called source code) prescribed by the programming language, resulting in a source code instruction (or statement) stream. The programmer then uses mechanisms that change the human readable form of the computer program into a form that can be understood by a computer system (called machine readable form, or object code). These mechanisms are typically called compilers; however, it should be understood that the term "compiler", as used within this specification, generically refers to any mechanism that transforms one representation of a computer program into another representation of that program.

This machine readable form, within this specification, is a stream of binary instructions (i.e., ones and zeros) that are meaningful to the computer. The compiler typically compiles each human readable statement into one or more machine readable instructions. Compilers generally translate each human readable statement in the source code instruction stream into one or more intermediate language instructions, which are then converted into corresponding machine-readable instructions. Special compilers, called optimizing compilers, typically operate on the intermediate language instruction stream to make it perform better (e.g., by eliminating unneeded instructions, etc.). Some optimizing compilers are wholly separate while others are built into a primary compiler (i.e., the compiler that converts the human readable statements into machine readable form) to form a multi-pass compiler. In other words, multi-pass compilers first operate to convert source code into an instruction stream in an intermediate language understood only by the compiler (i.e., as a first pass or stage) and then operate on the intermediate language instruction stream to optimize it and convert it into machine readable form (i.e., as a second pass or stage).

A compiler may reside within the memory of the computer which will be used to execute the object code, or may reside on a separate computer system. Compilers that reside on one computer system and are used to generate machine code for other computer systems are typically called "cross compilers." The methods and apparatus discussed herein apply to all types of compilers, including cross compilers.

Physical Registers Symbolic Registers Live Ranges

During the first pass or stage, the compiler typically assumes that an unlimited number of physical registers are available for the target central processing unit (CPU) to use. Thus, each time a program variable is encountered, it is assigned a new register in the intermediate language. However, in reality, the CPU typically has a fixed number of registers to use while executing a machine code instruction stream. Since the registers used in the intermediate language instruction stream have no correlation to physical CPU registers, they are known as symbolic registers. During the second pass or stage, the optimizing compiler typically must allocate the large number of symbolic registers to a much smaller number of physical registers available to the CPU.

This process, known as register allocation, is one of the principal applications for the method and apparatus of the present invention.

Figure 4:
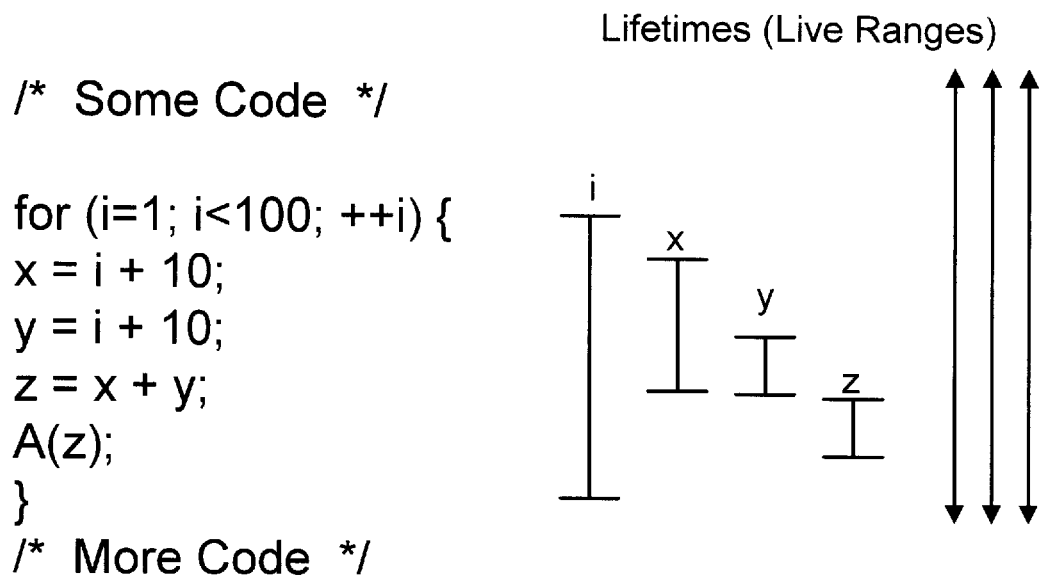
FIG. 4 is an illustration of the live ranges for symbolic registers in a portion of a source code instruction stream.

Register allocation in a compiler typically uses the concept of "live ranges." A "live range" for a variable, which may be a variable from the source program or a temporary variable generated by the compiler, is typically defined by a set of instructions for which the value contained in the symbolic register that represents the variable will be used in a subsequent computation. Referring to FIG. 4, the live ranges for variables i, x, y, and z are shown by vertical lines to the right of the instruction stream spanning the number of instructions that make up the live range. Note that various other live ranges are live for the entire for-loop of FIG. 4. The live range for a variable begins when the variable is defined, and ends at the last use of the variable that occurs before any other definition of the variable. Note that the definition of live range used herein is simplified for purposes of illustrating the concepts of the present invention. For example, a live range may actually contain multiple definitions and last uses for a variable. Those skilled in the art are familiar with the concept of live ranges, and the simplified definition used herein shall not be construed as limiting the application of the present invention. Thus, the live range for x in FIG. 4 begins when x is defined (i.e., x=i+10), and ends at the last use of x (i.e., z=x+y).

Each live range is assigned a unique "name" (e.g., i, x, y, and z in FIG. 4), which becomes a node on an interference graph. Two live ranges interfere with each other if they overlap, implying that a single physical register could not be used for both live ranges since they are both live (i.e., contain valid data) at the same time.

Referring again to FIG. 4, i interferes with (i.e., overlaps) x, y, and z; x interferes with i and y; y interferes with i and x; and z interferes with i. Note that i, x, y, and z also interfere with other live ranges shown to the right of FIG. 4, but these interferences are ignored in this discussion to illustrate how an interference graph may be built showing the interferences between i, x, y, and z.

Figure 5:
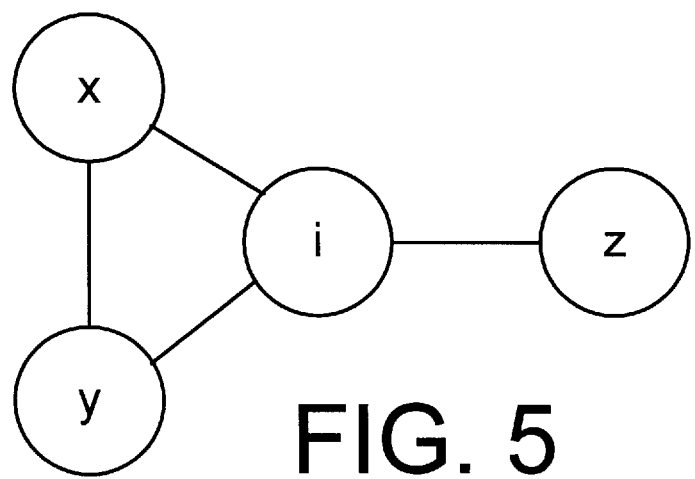
FIG. 5 is an interference graph of the live ranges shown in FIG. 4.

An interference graph for the live ranges of FIG. 4 is shown in FIG. 5. A check of the edges associated with each node in FIG. 5 shows that the interference information represented in the interference graph in FIG. 5 is equivalent to the interference information represented by the overlapping live ranges in FIG. 4, namely that i interferes with x, y, and z; x interferes with i and y; y interferes with i and x; and z interferes with i. Note that the program listing in FIG. 4 is a source code listing to illustrate the concept of live ranges. In practice, an optimizing compiler will compute the live ranges in the intermediate language instruction stream in order to build the interference graph that shows the relationship of symbolic registers. However, the concepts of the present invention apply to coloring any interference graph, whether representing variables in a source code instruction stream, symbolic registers in an intermediate language instruction stream, or any other relationship that may be represented on an interference graph.

We now assume for this example that the compiler constructs an interference graph based on symbolic registers in the intermediate language instruction stream. If all the live ranges of symbolic registers may be allocated to physical CPU registers, the optimizing compiler produces a machine code instruction stream with a minimal number of loads and stores to memory. Loads and stores to memory take considerably longer than operations to registers, and minimizing the number of loads and stores to memory is thus a primary goal of an optimizing compiler in order to minimize the execution time of the machine code instruction stream. If one or more of the symbolic registers cannot be allocated to a CPU register, the live range must be "spilled", meaning that the live range is allocated to a memory location rather than a register, and therefore must be loaded into a register from memory before use, and must be written back to memory after being changed. If the live range is spilled, spill code must be added to the intermediate language instruction stream to accomplish the required accesses to memory. The loading and storing of spilled live ranges adds overhead to the machine code instruction stream, slowing its execution time. Therefore, an optimizing compiler typically has a goal of efficiently allocating CPU registers to the highest number of symbolic registers possible, in order to minimize the overhead associated with spill code.

Register Allocation Mechanisms for Compilers

Figure 6A:
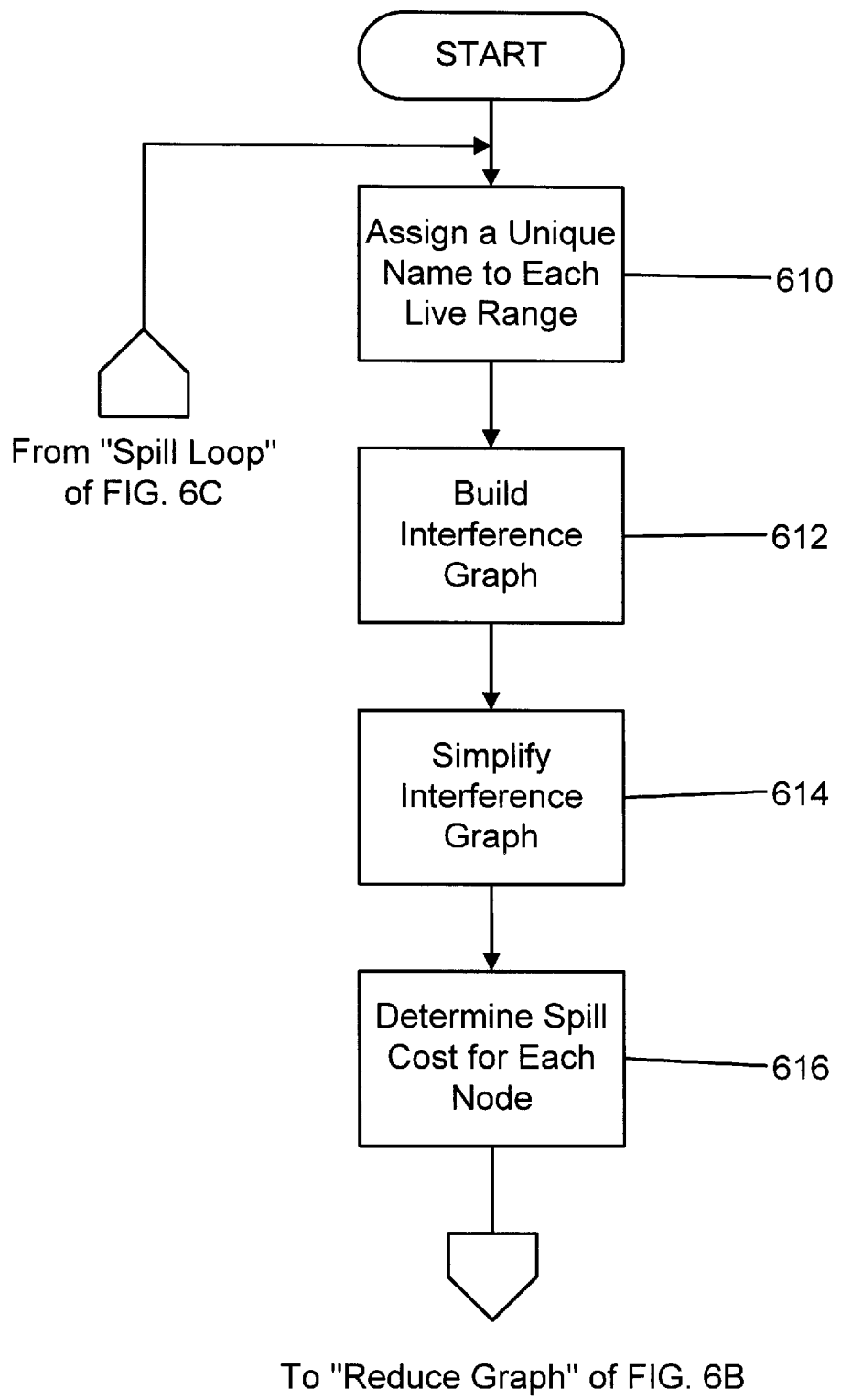
FIGS. 6A–6C is a flow diagram of a method for allocating registers in a compiler using interference graph.

A well-known mechanism for allocating registers in an optimizing compiler was developed by Gregory J. Chaitin of IBM, as disclosed in U.S. Pat. No. 4,571,678 *"Register Allocation and Spilling Via Graph Coloring"* (issued Feb. 18, 1986 to Chaitin and assigned to IBM); Gregory J. Chaitin et al., "Register Allocation Via Coloring", Computer Languages, Vol. 6, p. 47–57 (1981); and Gregory J. Chaitin, *"Register Allocation & Spilling Via Graph Coloring"*, SIGPLAN '82 Symposium on Compiler Construction, SIGPLAN Notices, Vol. 17, No. 6, p. 98–105 (June 1982). Chaitin's register allocation mechanism is represented by the flow diagram of FIGS. 6A–6C. Chaitin's register allocation mechanism operates on an intermediate language instruction stream, i.e., the instruction stream that results from the first pass or stage of an optimizing compiler. Referring now to FIG. 6A, the first step is to determine the various "live ranges" of the symbolic registers in the intermediate language instruction stream. Each live range is given a unique "name" (step 610). The live ranges of the names are then compared, interferences between names are identified, and an interference graph is constructed (step 612). In the interference graph, each name is represented by a node in the graph, and the interferences are represented by edges between nodes. The interference graph, as described in the Background section above, is defined such that no two nodes connected by an edge may be colored the same color. Once the interference graph is constructed, it may be simplified (step 614). One suitable simplification process is known as coalescing, which combines two names into a single name where appropriate. Chaitin then computes the predicted expense of spilling ("spill cost") for each node in the interference graph (step 616). With the completed interference graph and associated spill costs for each node, the interferences in the graph may now be analyzed.

Figure 6B:
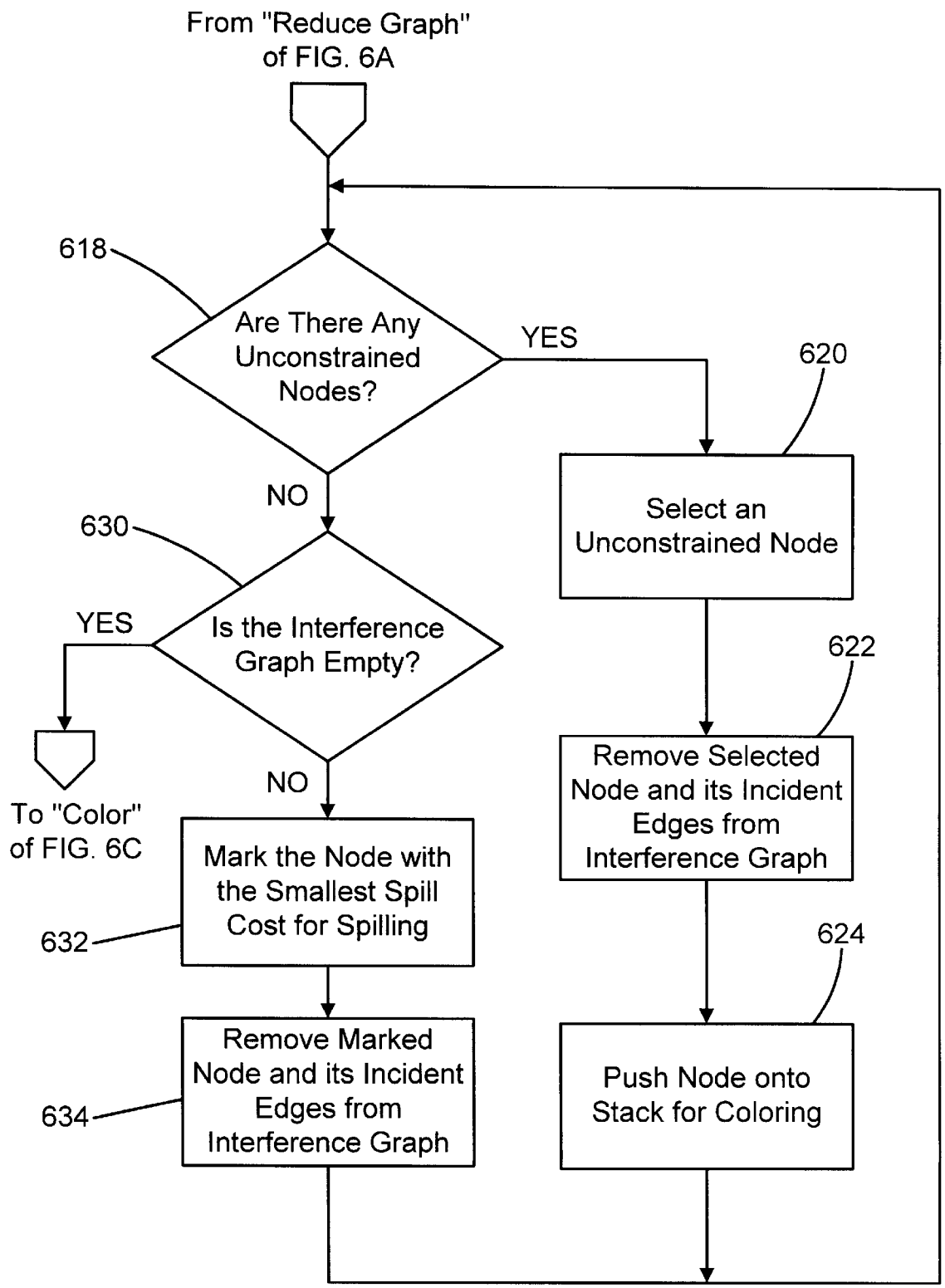

Now that the interference graph has been built, it may be used as a tool to allocate physical registers to names (i.e., live ranges). Referring now to FIG. 6B, Chaitin analyzes the interference graph by first checking to see if there are any unconstrained nodes (step 618), i.e., a node that has a degree (i.e., number of incident edges) less than the number of colors. If there are one or more unconstrained nodes, one of the unconstrained nodes is arbitrarily selected (step 620). The selected node and its incident edges are removed from the interference graph (step 622), and the node is then pushed onto the stack (step 624) for coloring. This process of removing unconstrained nodes (comprising steps 620, 622 and 624) continues until there are no more unconstrained nodes in the interference graph. When no more unconstrained nodes are present in the graph (step 618), Chaitin looks to see if the graph is empty (step 630). If the graph is empty without designating any nodes for spilling, the graph is colorable, and Chaitin will succeed in allocating a color to each node in the interference graph.

If the graph is not empty at step 630, then there remain in the interference graph only constrained nodes (i.e., nodes that have a degree greater than or equal to the number of colors). Chaitin marks one of the remaining nodes having the smallest spill cost for spilling (step 632), and removes the marked node and its incident edges from the graph (step 634). Chaitin calculates spill cost as a function of the number of instructions referring to the symbolic register, the nesting level, and the degree of the node, but many other heuristics may be used to determine which of the remaining constrained nodes are to be spilled. Note that the removal of the node to be spilled and its edges may result in one or more of the remaining nodes becoming unconstrained. This process of removing unconstrained nodes from the graph and pushing them on the stack (steps 620, 622, and 624) and/or marking various nodes for spilling and removing them from the graph (steps 632 and 634) continues until the graph is empty (step 630).

Figure 6C:
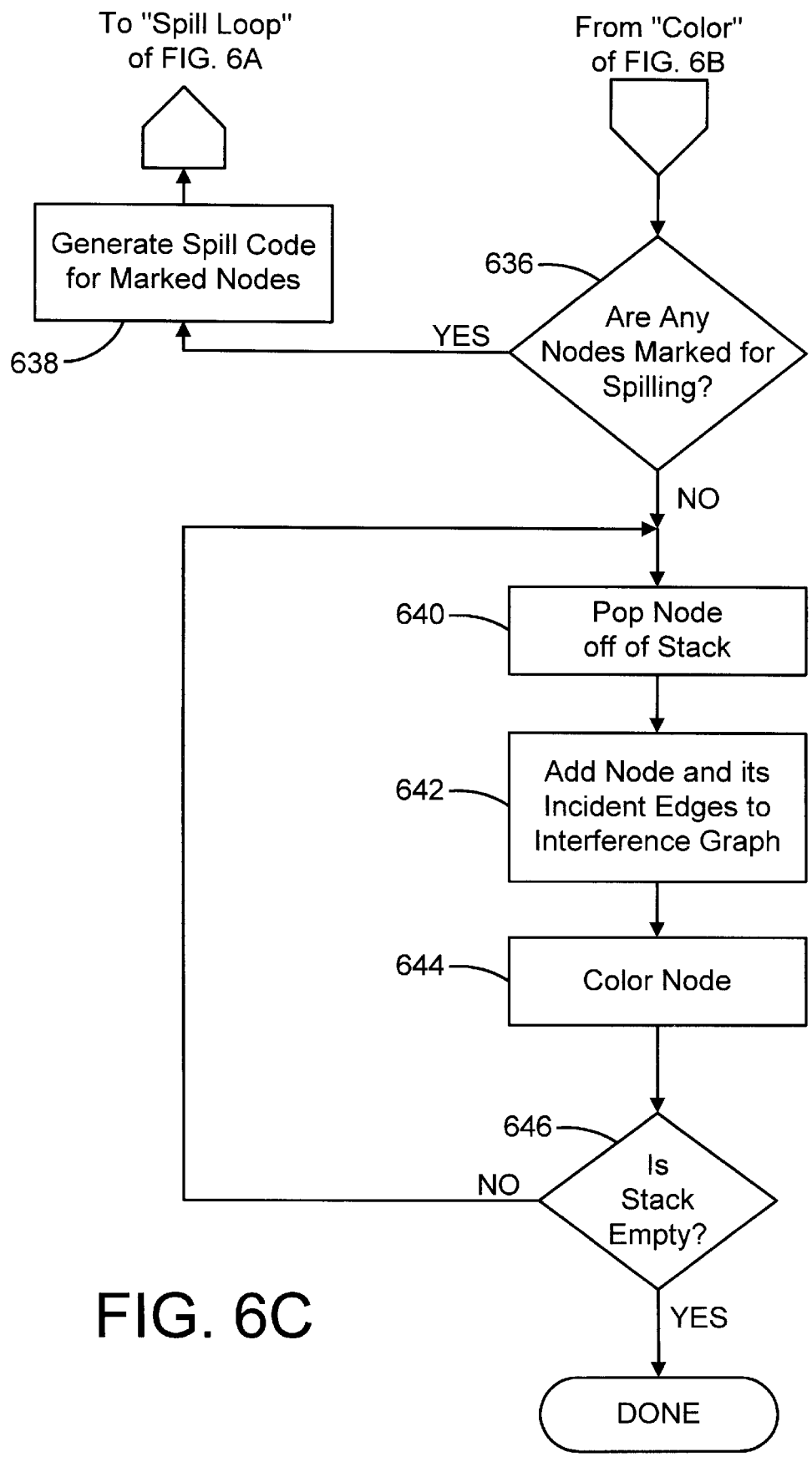

Referring to FIG. 6C, Chaitin next checks to see if any nodes were marked for spilling (step 636). If any nodes were marked for spilling, spill code is generated (step 638), and Chaitin loops back to the beginning of the process to re-build the interference graph to include the live ranges of the newly generated spill code. If no spill code was generated (step 636), the graph is colorable, and one by one the nodes are popped off the stack (step 640), put back into the interference graph with their incident edges (step 642), and assigned a color (step 644), until the stack is empty (step 646). The interference graph that results is fully colored. The compiler then assigns a physical CPU register to each color, and transforms the intermediate language instruction stream into the machine code instruction stream. With a fully colored graph, the compiler may thus assign every name (i.e., live range) to a physical CPU register, making the generation of additional spill code unnecessary.

Figure 2:
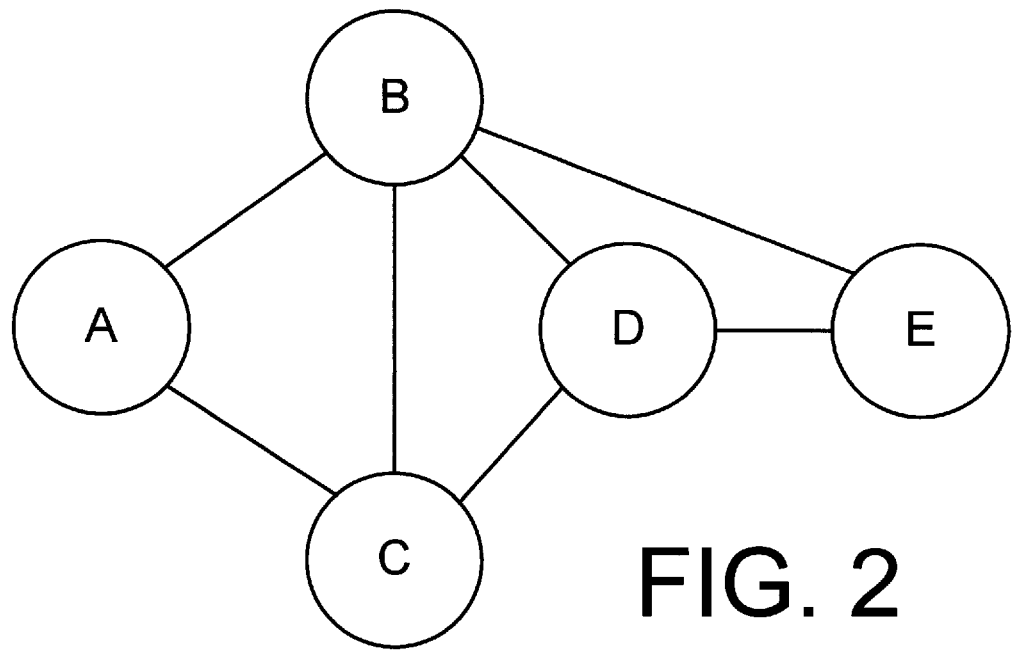
FIG. 2 is an interference graph that has five nodes and seven edges.

An example of the Chaitin coloring approach may be shown in reference to the interference graph of FIG. 2. This graph assumes that steps 610, 612, 614 and 616 of FIG. 6A have already been performed. Assuming a three-coloring of the graph is desired, initially nodes A and E are unconstrained (i.e., have less than three edges), while nodes B, C and D are constrained (i.e., have three or more edges). Referring to FIG. 6B, using Chaitin's approach, either of nodes A or E may be initially removed from the interference graph (step 618). We will arbitrarily choose node A (step 620), remove node A and its incident edges from the graph (step 622), and push node A onto the stack (step 624). With A and its incident edges removed, node C becomes unconstrained, node E remains unconstrained, and nodes B and D remain constrained. Arbitrarily choosing node C for removal (step 620), node C and its incident edges are removed from the graph (step 622), and node C is pushed onto the stack (step 624). As a result, node E remains unconstrained, and nodes B and D both become unconstrained. With all the remaining nodes (i.e., B, D, & E) unconstrained, we can arbitrarily choose the order of their removal (step 620), which we assume here is in the order B, D and E, and these nodes are removed from the graph (step 622) and pushed onto the stack (step 624). At this point the graph is empty (step 630), and no constrained nodes were marked for spilling (step 636), so the graph may be reconstructed and colors assigned by popping the nodes off the stack. The stack now has the following nodes, from bottom to top: A, C, B, D, E. Let's assume the three colors for this graph are red, green and blue. The first node off the stack is node E (step 640), which is put back into the interference graph with its incident edges (step 642), and assigned any one of the three colors. We arbitrarily choose red for node E (step 644). Node D is then popped off the stack (step 640) and added back into the interference graph with its incident edges (step 642). Node D may not be colored red, since its neighbor E is colored red, but may be colored either green or blue. We arbitrarily choose green for node D (step 644). Node B is then popped off the stack (step 640) and added back into the interference graph with its incident edges (step 642). Node B may not be colored red since its neighbor E is colored red, and may not be colored green since its neighbor D is colored green. Thus, B must be colored blue (step 644). Node C is then popped off the stack (step 640), and added back into the interference graph with its incident edges (step 642). Node C must be colored red (step 644) since node B is colored blue and node D is colored green. Node A is then popped off the stack (step 640) and added back into the interference graph with its incident edges (step 642). Node A must be colored green (step 644) since node B is colored blue and node C is colored red. This completes the coloring of the interference graph of FIG. 2, successfully assigning the three available colors to the five nodes, with A green, B blue, C red, D green, and E red.

Figure 3:
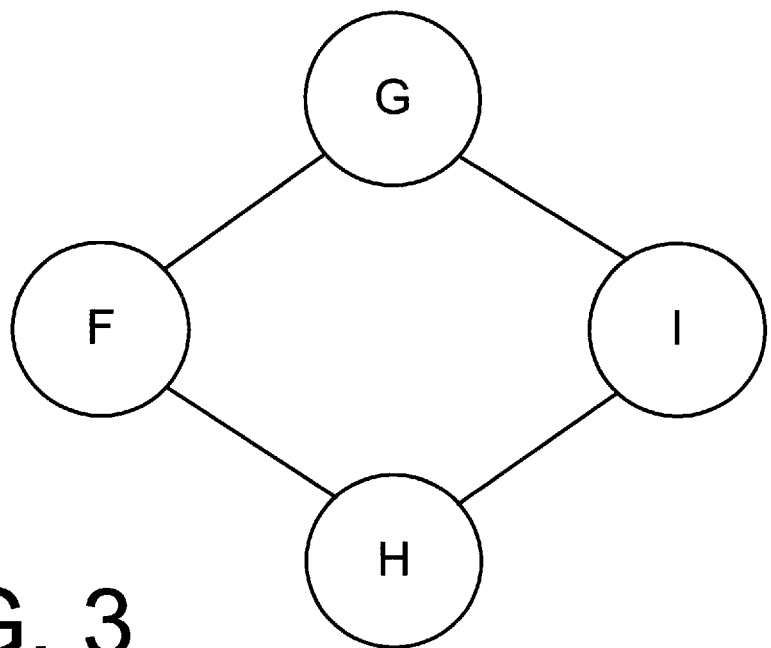
FIG. 3 is an interference graph that has four nodes and four edges.

The Chaitin approach works well in many circumstances, but may generate unnecessary spill code for graphs that are colorable. A simple example which illustrates the shortcomings of Chaitin is shown in FIG. 3. Assuming a two coloring of the graph is desired (red and blue), all the nodes are initially constrained, since the degree of each is two. According to Chaitin's approach, the node with the smallest spill cost will be marked for spilling and removed from the interference graph with its incident edges (steps 632 and 634). We select node F, assuming that node F has the smallest spill cost (or, in the alternative, that the spill costs are equal and node F is arbitrarily chosen). As a result of marking node F for spilling and removing node F and its incident edges from the interference graph, nodes G and H become unconstrained. If we arbitrarily select node G, push node G onto the stack, and remove node G and its incident edges from the interference graph, nodes H and I remain, both of which are now unconstrained. We arbitrarily choose node I, followed by node H. At this point the graph is empty (step 630), so we test to see if any nodes were marked for spilling (step 636). In this case, node F was marked for spilling, so spill code is generated for node F (step 638), and the process will have to be repeated to assure a coloring of the live ranges in the new spill code. Note, however, that spilling node F is unnecessary. It would be possible, for example, to color nodes G and H red and nodes F and I blue, resulting in a full coloring of the interference graph of FIG. 3.

This shortcoming of Chaitin was addressed in Preston Briggs et al., "*Coloring Heuristics for Register Allocation*", Proceedings of the SIGPLAN '89 Conference on Programming Language Design and Implementation, ACM Press, Vol. 24, No. 7, p. 275–284 (July 1989). Briggs suggested a more "optimistic" coloring approach. If an interference graph has only constrained nodes left, Briggs pushes one of the constrained nodes onto the stack, hoping later to be able to color it. In the case of the interference graph of FIG. 3, Briggs might select node F to push onto the stack, even though it is constrained. By removing node F, nodes G and H become unconstrained, and all the remaining nodes may be removed and pushed onto the stack. Assume the stack has the following order of nodes (bottom to top): F, G, I, H. Briggs pops node H off the stack, adds it back into the interference graph with its incident edges, and assigns it a color (e.g., red). Node I is then popped off the stack added to the graph, and colored blue. Node G is then popped off the stack, added to the graph, and colored red. Node F is then popped off the stack, added to the graph, and colored blue. Briggs thus obtains a successful two coloring of the interference graph of FIG. 2 even though Chaitin failed to do so.

Note that the Briggs approach will color a graph (e.g., FIG. 2) that may be reduced to the empty graph by removing unconstrained nodes in the same manner as the Chaitin coloring approach. The primary difference in Briggs appears when only constrained nodes remain in the interference graph. Chaitin pessimistically marks a node for spilling, while Briggs optimistically pushes a constrained node onto the stack, hoping to be able to color it later. Briggs thus potentially colors more nodes than is possible using Chaitin's approach.

Mechanisms of the Present Invention

The Chaitin method of allocating registers in an optimizing compiler as represented in detail in FIG. 6 shows the entire process of allocating physical registers to symbolic live ranges in an optimizing compiler. Note, however, that the mechanism of the present invention relates specifically to step 644, during which a selected node is colored. While the specific register allocation mechanism of both Chaitin and Briggs are discussed herein, these discussions provide a context for understanding the usefulness of the mechanisms of the present invention, and should not be construed as limiting. In fact, the coloring mechanism of the present invention is applicable to any type of generic problem that may be solved by the coloring of an interference graph.

As discussed in the Summary section, the mechanisms of the present invention use information relating to the colors of neighbors of uncolored constrained neighbors in selecting the color for each node in an interference graph. The information regarding the colors of neighbors of uncolored constrained neighbors may be used in any of a variety of ways to determine the best color depending on a number of different factors, selectable by the user by appropriately operating upon the color information according to a desired heuristic. The three embodiments disclosed herein are three methods in accordance with the present invention to select a color based on the colors of neighbors of a node's uncolored constrained neighbors. According to the rules of the interference graph, all three embodiments may only select a color if it is available, i.e., not used by one of the node's neighbors. The first embodiment selects an available color that occurs in any colored neighbor of the node's uncolored constrained neighbors. The second embodiment selects an available color according to the numerical count of each color in the neighbors of the node's uncolored constrained neighbors, or according to the numerical count of uncolored constrained neighbors that have each particular color in their neighbors. The third embodiment selects an available color that has the most desirable weighted value in the neighbors of the node's uncolored constrained neighbors. While these embodiments provide good illustrative examples of the benefits and advantages of the present invention, these examples are not limiting, and other methods of coloring not enumerated herein based on the colors of neighbors of a node's neighbors, whether colored or uncolored, and whether constrained or unconstrained, are clearly within the scope of the present invention.

DETAILED DESCRIPTION

Referring to FIG. 1, a computer system 100 in accordance with the present invention is an enhanced IBM AS/400 mid-range computer system. However, those skilled in the art will appreciate that the mechanisms and apparatus of the present invention apply equally to any computer system, regardless of whether the computer system is a complicated multi-user computing apparatus or a single user device such as a personal computer or workstation. Computer system 100 suitably comprises a CPU 110, main memory 120, a memory controller 130, an auxiliary storage interface 140, and a terminal interface 150, all of which are interconnected via a system bus 160. Note that various modifications, additions, or deletions may be made to the computer system 100 illustrated in FIG. 1 within the scope of the present invention such as the addition of cache memory or other peripheral devices; FIG. 1 is presented to simply illustrate some of the salient features of computer system 100.

CPU 110 performs computation and control functions of computer system 100, and comprises a suitable central processing unit with several internal registers 112. The registers 112 within CPU 110 correspond to the "physical registers" discussed in the Overview section above. CPU 110 may comprise a single integrated circuit, such as a microprocessor, or may comprise any suitable number of integrated circuit devices and/or circuit boards working in cooperation to accomplish the functions of a central processing unit. CPU 110 suitably executes an instruction stream 124 within main memory 120, and in response thereto acts upon information in physical registers 112.

Auxiliary storage interface 140 is used to allow computer system 100 to store and retrieve information from auxiliary storage, such as magnetic disk (e.g., hard disks or floppy diskettes) or optical storage devices (e.g., CD-ROM). Memory controller 130, through use of a processor separate from CPU 110, is responsible for moving requested information from main memory 120 and/or through auxiliary storage interface 140 to CPU 110. While for the purposes of explanation, memory controller 130 is shown as a separate entity, those skilled in the art understand that, in practice, portions of the function provided by memory controller 130 may actually reside in the circuitry associated with CPU 110, main memory 120, and/or auxiliary storage interface 140.

Terminal interface 150 allows system administrators and computer programmers to communicate with computer system 100, normally through programmable workstations. Although the system 100 depicted in FIG. 1 contains only a single main CPU 110 and a single system bus 160, it should be understood that the present invention applies equally to computer systems having multiple main CPUs and multiple I/O buses. Similarly, although the bus 160 of the preferred embodiment is a typical hardwired, multidrop bus, any connection means that supports bidirectional communication could be used.

Main memory 120 contains optimizing compiler 122, machine code instruction stream 124, application programs 126, and operating system 128. Within compiler 122 is a register allocation mechanism which allocates physical registers 112 within CPU 110 to instructions in machine code instruction stream 124 by coloring nodes in an interference graph according to the present invention. It should be understood that main memory 120 will not necessarily contain all parts of all mechanisms shown. For example, portions of application programs 126 and operating system 128 may be loaded into an instruction cache (not shown) for CPU 110 to execute, while other files may well be stored on magnetic or optical disk storage devices (not shown). In addition, compiler 122 may generate a machine code instruction stream 124 that is intended to be executed on a different computer system if compiler 122 is a cross-compiler.

The remainder of this specification describes how the present invention allocates physical registers 112 to instructions in machine code instruction stream 124. Those skilled in the art will appreciate that the present invention applies equally to any compiler or any instruction stream that may be optimized by representing the relationship between registers on an interference graph. In fact, as discussed above, the present invention relates to any application, whether computer-based or not, where an interference graph is constructed and colored to solve a problem.

Figure 7:
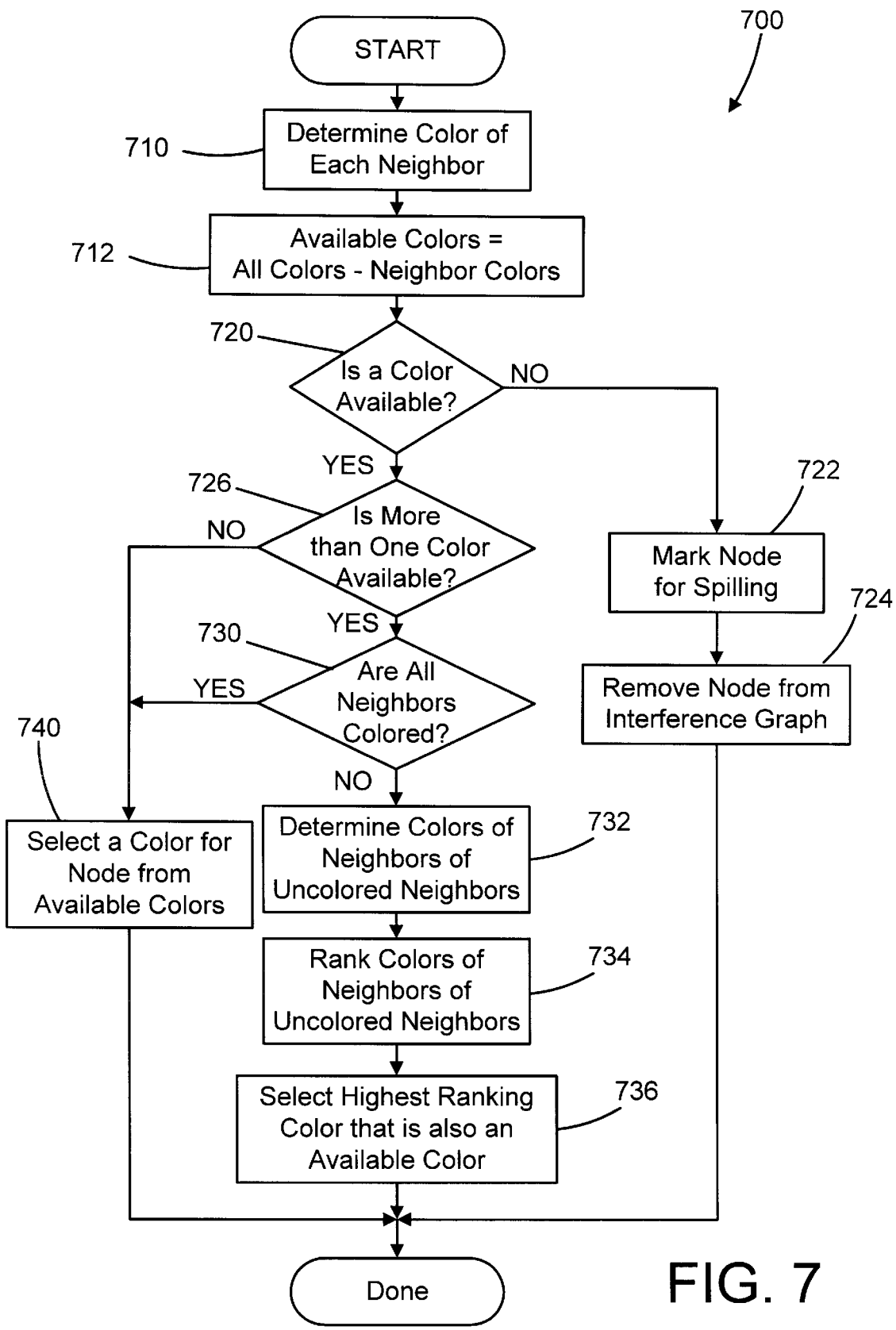
FIG. 7 is a flow diagram of the color selection method of the present invention.
Figure 8:
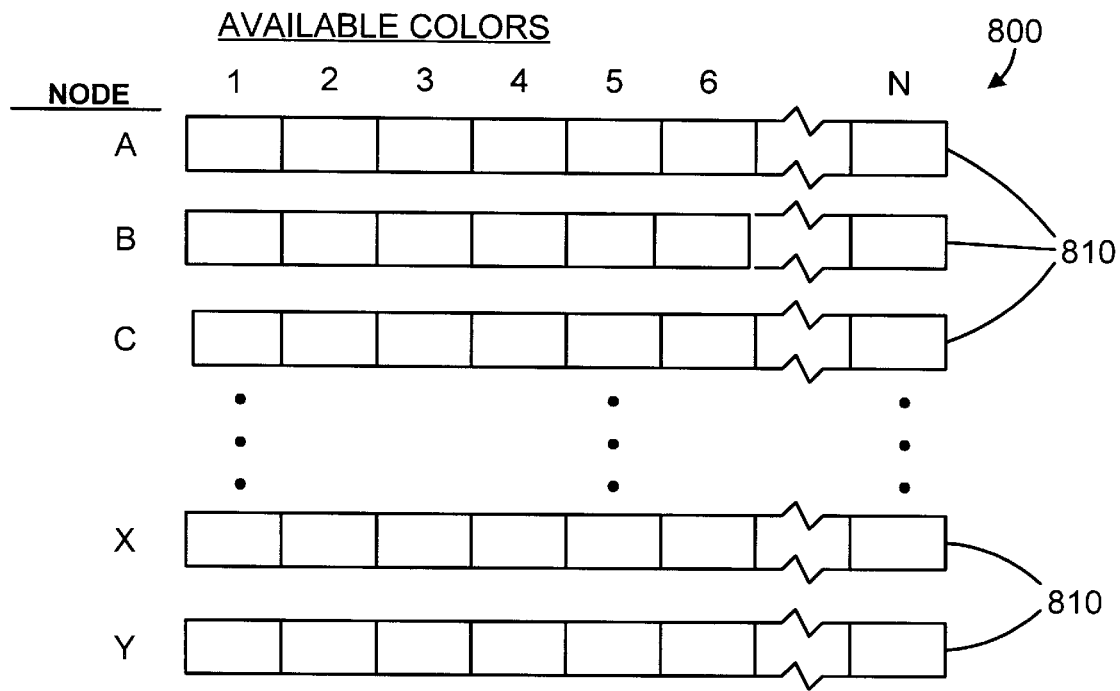
FIG. 8 is a table showing a bit vector of available colors for each node, which contains a one each color not assigned to a neighbor of the node.

Referring to FIG. 7, a method 700 of coloring a node in accordance with the present invention suitably comprises step 644 in Chaitin's approach (as illustrated in FIG. 6C), but may also be used in conjunction with any method which includes the step of selecting a color for a node in an interference graph. The method 700 of coloring a selected node may be represented by the flow diagram of FIG. 7. For our example, we select a node with name A. Next, the color of each neighbor is determined (step 710). The colors of a node's neighbors may be easily determined from a bit vector indicating available colors, as shown in FIG. 8. Each node in the interference graph has a corresponding bit vector 810 in a data structure 800. Data structure 800 suitably includes all the bit vectors 810 for all the nodes in the interference graph. While the bit vectors for each node are shown stored in a common data structure 800 (FIG. 8), the bit vector for each node could instead be dynamically derived as the information is required.

Each bit vector 810 represents the colors used by any neighbor as a zero (i.e., unavailable), and represents colors unused by neighbors as a one (i.e., available). Thus, the set of available colors for our hypothetical node A is all the colors in the bit vector 810 for node A that contain a one (step 712). Next, we determine from bit vector 810 if all the colors are used by neighbors (step 720), making no colors available for node A. If no colors are available for the node, all the bits in the bit vector 810 for node A will be zero. If no color is available, the node is marked for spilling (step 722) and removed from the interference graph along with its incident edges (step 724). Note, however, that for the specific Chaitin implementation shown in FIGS. 6A–C, the "Color Node" step (644) is not encountered unless no nodes have been marked for spilling (step 636), assuring that a color is available for the selected node. The steps of marking the node for spilling (722) and removing the node from the interference graph (724) are included for cases where the spill decision is deferred until the coloring step (as is the case for the Briggs coloring method discussed above).

Next we test to see if there is more than one color available for node A (step 726). If only one color is available, that color is selected for node A (step 740). If more than one color is available (step 726), we then test to see if all of A's neighbors in the original, unreduced interference graph are colored (step 730). If A's neighbors are all colored, there are no uncolored neighbors that need "help" by an intelligent choice of color for node A, so any of the available colors may be selected (step 740) using any appropriate heuristic.

If all of A's neighbors are not colored (step 730), we determine the colors of the neighbors of A's uncolored constrained neighbors (step 732). We then rank the colors according to priority (step 734) (e.g., from highest rank (most desirable) to lowest rank (least desirable)). We then select the color for A that is the highest rank and that is also an available color (step 736).

The step of ranking the colors of the neighbors of the uncolored neighbors (step 734) may be accomplished using a number of different heuristics. Three possible heuristics for ranking the colors of the neighbors of the uncolored neighbors are discussed herein in reference to the three embodiments of the present invention. These 5 three embodiments are most easily understood with reference to the sample interference graph of FIG. 9, along with the accompanying data structures in FIGS. 10–12.

Figure 9:
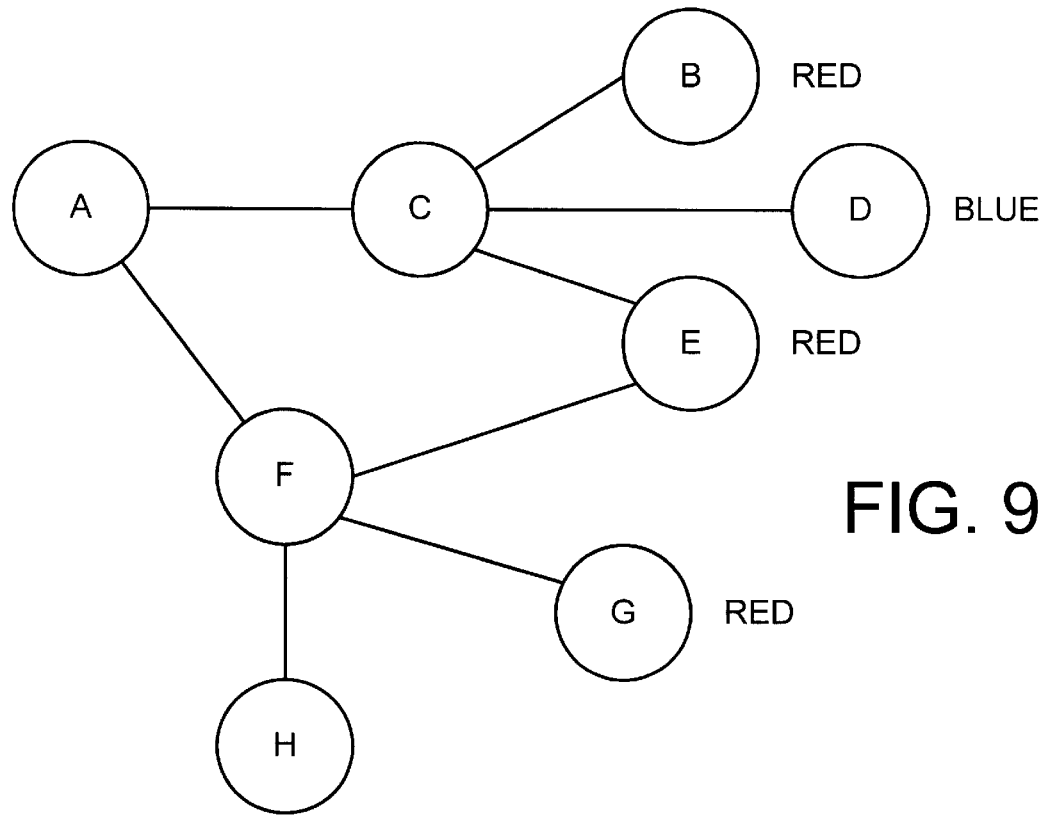
FIG. 9 is an interference graph with eight nodes and eight edges.

The interference graph of FIG. 9 is assumed to be a small portion of a much larger graph. We assume there are three colors available (red, green and blue), and we assume that nodes B, E and G have been colored red and that node D has been colored blue. Nodes A, C, F and H are uncolored, and node A is selected for coloring. This arrangement could result from applying the Briggs optimistic coloring approach. Briggs could achieve the graph in FIG. 9 by a variety of different stack configurations, corresponding to different orders of removing nodes from the graph. One such stack configuration that would result in the conditions above is (from bottom to top): H, C, F, A, G, E, D, B. To achieve this ordering of nodes on the stack, various other edges (not shown in FIG. 9) must be constraining some of the nodes. Pushing H onto the stack first is not a problem assuming H is unconstrained. Note, however, that C is the next node pushed onto the stack, and C is initially constrained in FIG. 9. According to the Briggs method of coloring, all unconstrained nodes are removed first before pushing a constrained node onto the stack. For this reason, in order for C to be pushed onto the stack after H, all other nodes must be constrained. We therefore assume that there are various other edges that are not shown in FIG. 9 which constrain nodes A, B, D, E, and G, allowing constrained node C to be pushed onto the stack after node H. Assuming that all remaining nodes are still constrained after node C is removed from the interference graph, constrained node F can next be pushed onto the stack, followed by the rest of the nodes in the order listed above.

With the stack configuration listed above and the stated assumptions for node colors, node B is popped off the stack first, and is colored red. Node D is then popped off the stack and colored blue. Node E is then popped off the stack and colored red. Node G is then popped off the stack and colored red. A color priority scheme could be used that would prioritizes the colors (from highest to lowest): green, red, and blue. This means that green will be used if available, and if not red will be used, and if neither red nor green are available, blue will be used. With these assumptions, node B must have at least one incident edge (not shown) that connects to a node that is colored green in order to be colored red (the second priority color). Node D, in order to be colored blue, must have at least two incident edges that are not shown, one of which is connected to a node colored green, and another of which is connected to a node colored red. Likewise, in order to be colored red, nodes B and G must both have at least one incident edge (not shown) connected to a node colored green.

With these initial conditions, we now consider how the unmodified Briggs approach will result in unnecessary spill code. Node A is popped off the stack next. According to the coloring scheme of Briggs, node A will be colored with the highest priority color (green), assuming that green is an available color, i.e., that A has no green neighbors. Note, however, that coloring node A green results in node C becoming uncolorable. When node C is popped off the stack, no colors are available, and it must be spilled. As shown below, this spilling may be avoided by a more intelligent selection of color based on the method of the present invention.

First Embodiment—color Bit Mask

Figure 10:
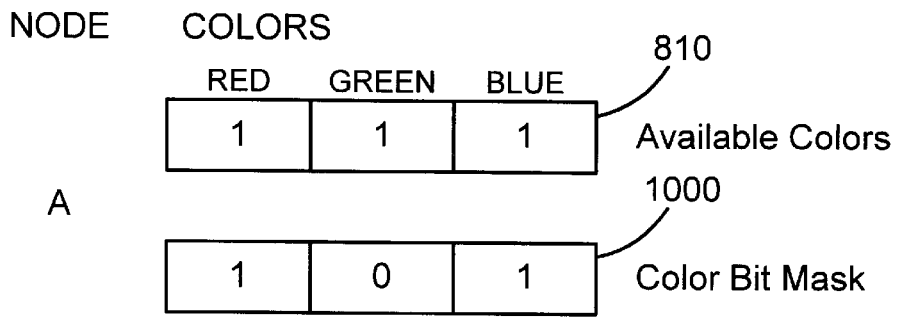
FIG. 10 shows the values in the available colors bit vector and the color bit mask for the interference graph of FIG. 9 in accordance with the first embodiment of the present invention.

The first method of ranking the colors of the uncolored constrained neighbors uses a color bit mask 1000, as shown in FIG. 10, in conjunction with the bit vector 810 for the selected node indicating available colors. The color bit mask 1000 has one bit per color for the selected node. The bit is set to a one if the corresponding color is assigned to a neighbor of an uncolored constrained neighbor of the selected node. For example, the color bit mask for node A in FIG. 9 has a one in the red bit, a zero in the green bit, and a one in the blue bit, (1,0,1), indicating that red and blue occur in neighbors of node A's uncolored constrained neighbors, but that green does not. Referring to FIG. 9, node A has two uncolored constrained neighbors, C and F. The colors of neighbors (i.e., B, D, E, G and H) of A's uncolored constrained neighbors (i.e., C and F) are represented in the color bit mask 1000 by setting the red bit to a one (due to nodes B, E and G being red), and by setting the blue bit to a one (due to node D being blue).

Once the color bit mask 1000 has been calculated, a logical AND is performed between color bit mask 1000 and bit vector 810 to cancel out any colors in color bit mask 100 that are used by A's neighbors. In the specific example of FIG. 9, node A only has two neighbors, C and F, neither of which are colored. As a result, the bit vector 810 for node A in the interference graph of FIG. 9 is all ones (FIG. 10), indicating that all three colors are available for node A, and the logical AND function will thus leave the color bit mask 1000 unaffected. The resulting color bit mask has a one in the red and blue bits and a zero in the green bit (1,0,1), indicating that node A may be colored either red or blue, but not green. By coloring node A either red or blue, node C may later be colored green, avoiding the unnecessary spill of node C that occurs with the unmodified Briggs approach.

It is important to note that if the AND function between the bit vector 810 of available colors and color bit mask 1000 yields all zeroes, the color bit mask 1000 is not used to determine the color of the selected node. Instead, one of the available colors (if any) are selected from the bit vector 810 of available colors. This fact emphasizes that the present invention simply adds additional intelligence to the color selection process if appropriate, without negatively affecting the colorability of the interference graph. In the worst case, even if there are no available colors that appear in neighbors of a node's uncolored constrained neighbors, the color selection process simply reverts to other heuristics for selecting a color from the available colors, such as the priority coloring scheme used by Briggs.

Since two colors (red and blue) appear in the color bit mask 1000, and are available colors (i.e., were not cleared during the AND operation) one of these may be selected at random for node A, or, in the preferred implementation, a heuristic is applied to the two colors to essentially "rank" them in order or priority according to predetermined criteria (step 734 of FIG. 7). The highest ranking color in the color bit mask 1000 (after the earlier ANDing with the bit vector 810) (step 736, FIG. 7) results in a more intelligent selection of color for node A that will "help" its uncolored constrained neighbors to be colorable by removing a constraint imposed by an edge by selecting a color that is already selected by another neighbor of the uncolored constrained neighbor.

In the preferred implementation of this first embodiment, color bit mask 1000 is dynamically computed for each node when the node is selected for coloring by examining in turn each colored neighbor of each uncolored constrained neighbor, and setting the appropriate color bit. Note, however, that this information could alternatively be stored simultaneously for all nodes in an array or other data structure similar to data structure 800 of FIG. 8. The selection of how to compute and store the color bit mask will be dictated by various compiler parameters, such as anticipated compile time, size of memory needed for data structures, etc. The present invention encompasses all methods for computing and/or storing color bit mask 1000.

Second embodiment—Color Counting Mask

Figure 11:
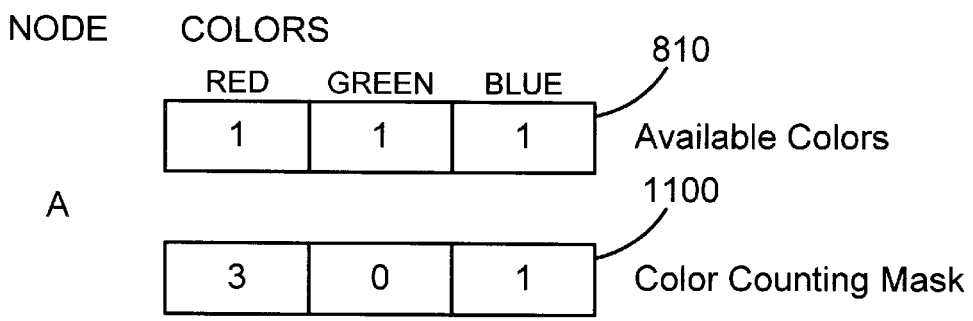
FIG. 11 shows the values in the available colors bit vector and the color counting mask for the interference graph of FIG. 9 in accordance with the second embodiment of the present invention.

According to the second embodiment of the present invention, a color counting mask 1100 is used in conjunction with the bit vector 810 to select a color that is used by a neighbor of an uncolored constrained neighbor according to a heuristic that counts the occurrences of each color, as shown in FIG. 11. Color counting mask 1100 has the same basic function as the color bit mask 1000 of FIG. 10, with the exception that color counting mask 1100 has integer values rather than binary values, allowing the color counting mask to count the number of occurrences of each color in all colored neighbors of uncolored constrained neighbors of the selected node. Assuming for illustrative purposes that a node is counted only once even if it appears more than once as a neighbor of uncolored constrained neighbors, the interference graph of FIG. 9 results in a color counting mask 1100 with a three in the red field, a zero in the green field, and a one in the blue field: (3,0,1). The three in the red field corresponds to the three nodes (ie., B, E and G) that are neighbors of uncolored constrained neighbors of A, while the one in the blue field corresponds to the one node (i.e., D) that is a neighbor of uncolored constrained neighbors of A.

The color counting mask 1100, once computed, must be logically ANDed with the bit vector 810 to cancel out any unavailable colors (i.e., colors that are used by neighbors of A). Note, however, that the bit vector 810 for the interference graph shown in FIG. 11 is all ones, indicating that no neighbors of A have been colored yet, and that all colors are available. Thus, the AND function in this particular example does not affect the contents of the color counting mask 1100. Note, however, that if a neighbor of A was already colored red, the AND operation would result in clearing the red field to zero, yielding a color counting mask 1100 of (0,0,1) rather than (3,0,1), which would eliminate red as a possible color for A.

Referring to FIG. 7, the numerical count of the frequency of colors may be operated on by any appropriate heuristic to rank the colors (step 734) to determine which color to assign to node A (step 736). One such heuristic is to select the available color with the highest number in color counting mask 1100. Choosing the color with the highest count results in a higher probability of minimizing the number of colors used in the interference graph. Another heuristic would choose the available color with the smallest non-zero number in an attempt to "smooth out" the counting mask. Whatever the heuristic used, the second embodiment encompasses all methods of selecting a color using a color counting mask which counts the number of occurrences of colors in the neighbors of the selected node's uncolored constrained neighbors.

An alternative heuristic that could be implemented in accordance with the second embodiment of the present invention uses color counting mask 1100 to count, not the number of nodes of each color in the neighbors of uncolored constrained neighbors, but rather the number of uncolored constrained neighbors that have that color for a neighbor. This implementation gives an indication of how many uncolored constrained neighbors will be helped if a particular color is selected. With the specific example of coloring node A in FIG. 9, the color red would receive a count of two, indicating that there are two uncolored constrained neighbors (ie., C and F) that each have a red neighbor, while the color blue would receive a count of one, indicating that there is one uncolored constrained neighbors (i.e., F) that has blue neighbor. Counting mask 1100 thus has a two in the red field, a zero in the green field, and a one in the blue field (2,0,1), indicating that more uncolored constrained neighbors are helped by choosing red than blue.

As is the case for the color bit mask 1000 of FIG. 10, the color counting mask 1100 is preferably dynamically computed for each node when the node is selected for coloring, but may also be pre-computed and stored in an array similar to data structure 800 in FIG. 8. In addition, like the first embodiment, the second embodiment simply reverts to a heuristic based on the bit vector 810 (i.e., available colors) for a node if the AND function results in all zeroes.

Third Embodiment—Weighted Color Counting Mask

According to the third embodiment of the present invention, a weighted color counting mask 1200 is used in conjunction with the bit vector 810 to select a color that is used by a neighbor of an uncolored constrained neighbor according to a heuristic that weights each color at each node according to predetermined criteria. For example, one pertinent criteria for weighting is the maximum loop depth spanned by the live ranges of the uncolored constrained neighbors. One possible method for weighting colors would assign a value of 1 to a live range that does not overlap any loops, a value of 10 to a live range that overlaps a singly-nested loop, a value of 100 to a live range that overlaps a doubly-nested loop, etc. Assume, for purposes of illustration, that node C represents a live range that does not overlap any loop, while node F represents a live range that overlaps a doubly-nested loop. Each color that occurs in C's neighbors are therefore given a value of 1, corresponding to the weight of C. In similar fashion, each color that occurs in F's neighbors are given a value of 100, corresponding to the weight of F. Referring again to FIG. 7, the weighted values in the color fields may be operated on by any appropriate heuristic to rank the colors (step 734) to determine which color to assign to node A (step 736). Whatever the weighting criteria or heuristic used to operate upon the weights, the third embodiment encompasses all methods of selecting a color using a weighted color counting mask which accumulates the weighted value of colors in the neighbors of the selected node's uncolored constrained neighbors.

Figure 12:
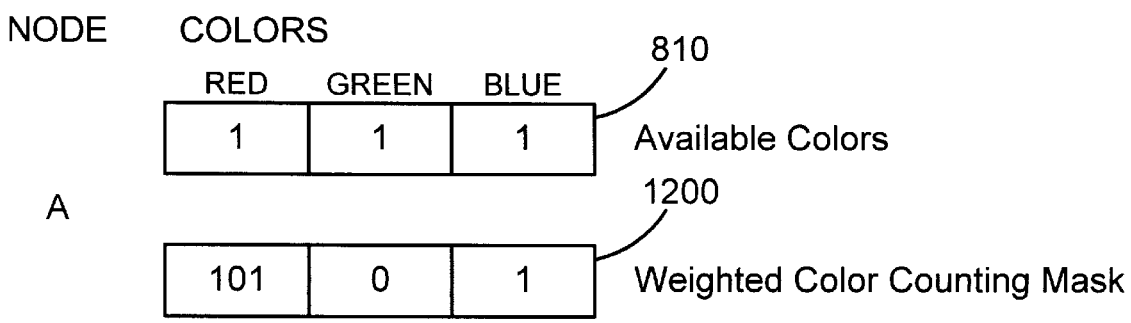
FIG. 12 shows the values in the available colors bit vector and the weighted color counting mask for the interference graph of FIG. 9 in accordance with the third embodiment of the present invention.

One example of an appropriate heuristic simply adds the weighted values for each color, as shown in FIG. 12, to arrive at a total weighted value for each color. The weighted value of red nodes are 1 for C and 100 for F. Thus, the sum of the red weighted values is 101, so 101 is entered into the red field of weighted color counting mask 1200. The weighted value of blue nodes is 1 (for D), so 1 is entered into the blue field of weighted color counting mask 1200. The resulting mask 1200 is (101,0,1). The available color with the highest weight is then selected for node A, which would be red for the specific example shown in FIG. 12.

The weighted color counting mask 1200, once computed, must be logically ANDed with the bit vector 810 to cancel out any unavailable colors (i.e., colors that are used by neighbors of A). Note, however, that the bit vector 810 for the interference graph shown in FIG. 12 is all ones, indicating that no neighbors of A have been colored yet, and that all colors are available. Thus, the AND function in this particular example does not affect the contents of weighted color counting mask 1200. Note, however, that if a neighbor of A was already colored red, the AND operation would result in clearing the red field to zero, yielding a weighted color counting mask 1200 of (0,0,1) rather than (101,0,1), thereby eliminating red as a possible color for A, resulting in blue being selected for A.

As is the case for the color bit mask 1000 and color counting mask 1100, weighted color counting mask 1200 is preferably dynamically computed for each node when the node is selected for coloring, but may also be pre-computed and stored in an array similar to data structure 800 in FIG. 8. In addition, like the first and second embodiments, the third embodiment simply reverts to a heuristic based on the bit vector 810 (i.e., available colors) for a node if the AND function results in all zeroes.

The preferred embodiments enhance the colorability of an interference graph (i.e., color more nodes) by more intelligently selecting a color for a node based on one or more heuristics that will tend to remove color constraints from uncolored constrained nodes in the interference graph. For the specific example of register allocation in an optimizing compiler, by coloring more nodes in the interference graph, less spill code is required, reducing the execution time of the resultant machine code instruction stream.

While the invention has been particularly shown and described with reference to preferred exemplary embodiments thereof, it will be understood by those skilled in the art that various changes in form and details may be made therein without departing from the spirit and scope of the invention.

We claim:

1. A computer apparatus comprising:
a central processing unit having a plurality of registers, the central processing unit executing a first instruction stream and in response to the first instruction stream, the central processing unit operates on information stored in the plurality of registers;
a compiler for generating the first instruction stream from a second instruction stream, the second instruction stream having a plurality of variables, the compiler including:
a live range calculator for determining a plurality of live ranges for the plurality of variables;
a register allocator for assigning the plurality of registers within the central processing unit to the plurality of live ranges by building an interference graph with a plurality of nodes and a plurality of edges, each node of the interference graph representing one of the plurality of live ranges, two of the plurality of nodes being neighbors if the two nodes are connected with an edge, the interference graph requiring that neighbors be colored with different colors and by selecting a color for each node in the interference graph according to the colors, if any, assigned to one of the plurality of nodes which are neighbors to uncolored neighbors of the node to be colored.

2. The computer apparatus of claim 1 wherein the first instruction stream comprises a machine code instruction stream, wherein the second instruction stream comprises an intermediate language instruction stream, and wherein the plurality of variables comprise a plurality of symbolic registers within the intermediate language instruction stream.

3. A computer apparatus for generating a first instruction stream executable on a central processing unit from a second instruction stream, the second instruction stream having a plurality of variables, the computer apparatus comprising:

a live range calculator for determining a plurality of live ranges for the plurality of variables; and a register allocator for assigning the plurality of registers within the central processing unit to the plurality of live ranges by building an interference graph with a plurality of nodes and a plurality of edges, each node of the interference graph representing one of the plurality of live ranges, two of the plurality of nodes being neighbors if the two nodes are connected with an edge, the interference graph requiring that neigbors be colored with different colors, and by selecting a color for each node in the interference graph according to the colors, if any, assigned to one of the plurality of nodes which are neighbors to uncolored neighbors of the node to be colored.

4. The computer apparatus of claim 3 wherein the first instruction stream comprises a machine code instruction stream, wherein the second instruction stream comprises an intermediate language instruction stream, and wherein the plurality of variables comprise a plurality of symbolic registers within the intermediate language instruction stream.

5. A program product comprising:

a recordable media; and a compiler recorded on the recordable media, the compiler being used to generate a first instruction stream executable on a central processing unit in a computer apparatus from a second instruction stream, the second instruction stream having a plurality of variables, the compiler including:

a live range calculator for determining a plurality of live ranges for the plurality of variables; and a register allocator for assigning the plurality of registers within the central processing unit to the plurality of live ranges by building an interference graph with a plurality of nodes and a plurality of edges, each node of the interference graph representing one of the plurality of live ranges, two of the plurality of nodes being neighbors if the two nodes are connected with an edge, the interference graph requiring that neighbors be colored with different colors, and by selecting a color for each node in the interference graph according to the colors, if any, assigned to one of the plurality of nodes which are neighbors to uncolored neighbors of the node to be colored.

6. The computer apparatus of claim 5 wherein the first instruction stream comprises a machine code instruction stream, wherein the second instruction stream comprises an intermediate language instruction stream, and wherein the plurality of variables comprise a plurality of symbolic registers within the intermediate language instruction stream.

7. A method for allocating a plurality of resources to a plurality of items by coloring an interference graph with a number of colors not to exceed the number of the plurality of resources, comprising the steps of:

placing a plurality of nodes into the interference graph, each node corresponding to a least one of the plurality of items;

placing a plurality of edges into the interference graph interconnecting the plurality of nodes, each edge having two ends and representing an interference between the two nodes coupled to the two ends, two of the plurality of nodes being neighbors if the two nodes are connected by an edge, the interference graph requiring that neighbors be colored with different colors;

selecting one of the plurality of nodes for coloring; and selecting a color for the selected node by selecting one of the colors, if any, assigned to any one of the neighbors of uncolored neighbors of the selected node.

8. The method of claim 7 wherein the step of selecting a color for the selected node comprises the steps of:

determining the colors of the neighbors of the selected node;

designating the colors not used by the neighbors of the selected node as available colors;

counting the number of occurrences of each color in the neighbors of the uncolored neighbors of the selected node; and selecting one of the colors of the neighbors of the uncolored neighbors of the selected node that is designated as an available color and that has a count with a predetermined numerical relationship to the counts of the other colors in the neighbors of the uncolored neighbors of the selected node.

9. The method of claim 7 wherein the step of selecting a color for the selected node comprises the steps of:

determining the colors of the neighbors of the selected node;

designating the colors not used by the neighbors of the selected node as available colors;

for each color, counting the number of uncolored neighbors of the selected node that have neighbors of the color; and selecting one of the colors that is designated as an available color and that has a count with a predetermined numerical relationship to the counts of the other colors.

10. The method of claim 7 wherein the step of selecting a color for the selected node comprises the steps of:

determining the colors of the neighbors of the selected node;

designating the colors not used by the neighbors of the selected node as available colors;

assigning a weighted color value to each of the uncolored neighbors of the selected node according to at least one predetermined criterion;

performing a mathematical operation on the weighted color values to arrive at a total weighted value for each color; and selecting a color of one of the neighbors of the uncolored neighbors of the selected node that is designated as an available color and that has the highest total weighted value.

11. A computer implemented method for allocating a plurality of registers within a central processing unit to a plurality of variables within an instruction stream, comprising the steps of:

determining a plurality of live ranges for the plurality of variables;

building an interference graph with a plurality of nodes and a plurality of edges, each live range corresponding to one of the plurality of nodes in the interference graph, the edges of the interference graph representing interferences between nodes, two of the plurality of nodes being neighbors if the two nodes are connected by an edge the interference graph that neighbors be colored with different colors;

coloring the interference graph with a number of colors not to exceed the number of the plurality of registers within the central processing unit, the coloring step including the steps of:

selecting a node to be colored; and selecting a color for the selected node by selecting one of the colors, if any, assigned to the neighbors of uncolored neighbors of the selected node.

12. The computer implemented method of claim 11 wherein the step of selecting a color for the selected node comprises the steps of:

determining the colors of the neighbors of the selected node;

designating the colors not used by the neighbors of the selected node as available colors;

counting the number of occurrences of each color in the neighbors of the uncolored neighbors of the selected node; and selecting one of the colors of the neighbors of the uncolored neighbors of the selected node that is designated as an available color and that has a count with a predetermined numerical relationship to the counts of the other colors in the neighbors of the uncolored neighbors of the selected node.

13. The computer implemented method of claim 11 wherein the step of selecting a color for the selected node comprises the steps of:

determining the colors of the neighbors of the selected node;

designating the colors not used by the neighbors of the selected node as available colors;

for each color, counting the number of uncolored neighbors of the selected node that have neighbors of the color; and selecting one of the colors that is designated as an available color and that has a count with a predetermined numerical relationship to the count of the other colors.

14. The computer implemented method of claim 11 wherein the step of selecting a color for the selected node comprises the steps of:

determining the colors of the neighbors of the selected node;

designating the colors not used by the neighbors of the selected node as available colors;

assigning a weighted color value to each of the uncolored neighbors of the selected node according to at least one predetermined criterion;

performing a mathematical operation on the weighted color values to arrive at a total weighted value for each color; and selecting a color of one of the neighbors of the uncolored neighbors of the selected node that is designated as an available color and that has the highest total weighted value.

15. The computer implemented method of claim 11 further comprising the step of assigning each color to a unique one of the plurality of registers within the central processing unit, each variable of a given color accessing the register within the central processing unit corresponding to the color.

16. A method for distributing a program product comprising the steps of:

initiating a connection between a first computer system and a second computer system;

transmitting the program product from the first computer system to the second computer system, the program product being a compiler, the compiler being used to generate a first instruction stream executable by a central processing unit in a computer apparatus from a second instruction stream, the second instruction stream including a plurality of variables, the compiler including a live range calculator for determining a plurality of live ranges for the plurality of variables, and the compiler further including a register allocator for assigning the plurality of registers within the central processing unit to the plurality of live ranges by building an interference graph with a plurality of nodes and a plurality of edges, each node of the interference graph representing one of the plurality of live ranges, two of the plurality of nodes being neighbors if the two nodes are connected with an edge, the interference graph requiring that neighbors be colored with different colors, and by selecting a color for each node in the interference graph according to the colors, if any, assigned to one of the plurality of nodes which are neighbors to uncolored neighbors of the node to be colored.

* * * * *

UNITED STATES PATENT AND TRADEMARK OFFICE
CERTIFICATE OF CORRECTION

PATENT NO. : 5,774,730

DATED : June 30, 1998

INVENTOR(S) : Aizikowitz, et al

It is certified that error appears in the above-identified patent and that said Letters Patent is hereby corrected as shown below:

Col. 18, Line 66, after "edge" insert a --,--.

Col. 18, Line 66, after "graph" insert --requiring--.

Col. 20, Line 28, "including-a" should be --including a--.

Signed and Sealed this

Twenty-seventh Day of October, 1998

*Attest:*

BRUCE LEHMAN

*Attesting Officer*     *Commissioner of Patents and Trademarks*